(12) United States Patent  
Kato et al.

(10) Patent No.: US 9,204,057 B2  
(45) Date of Patent: Dec. 1, 2015

(54) IMAGING APPARATUS FOR SHADING CORRECTION

(71) Applicant: Sony Corporation, Tokyo (JP)

(72) Inventors: Takashi Kato, Gifu (JP); Toshiaki Konno, Gifu (JP); Atsushi Oohata, Gifu (JP); Yuichiro Totsuka, Kanagawa (JP); Hiroki Hagiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 120 days.

(21) Appl. No.: 13/900,035

(22) Filed: May 22, 2013

(65) Prior Publication Data

US 2013/0321695 A1 Dec. 5, 2013

(30) Foreign Application Priority Data

Jun. 1, 2012 (JP) ................. 2012-126406

(51) Int. Cl.
*H04N 5/235* (2006.01)
*H04N 5/238* (2006.01)
*H04N 5/217* (2011.01)
*G03B 9/08* (2006.01)

(52) U.S. Cl.
CPC ............... *H04N 5/2353* (2013.01); *G03B 9/08* (2013.01); *H04N 5/217* (2013.01); *H04N 5/238* (2013.01)

(58) Field of Classification Search
CPC ..... H04N 5/3572; H04N 5/2353; G06T 5/006
USPC ........... 348/207.99, 251, 252, 248, 249, 250, 348/255, 241
See application file for complete search history.

(56) References Cited

U.S. PATENT DOCUMENTS

| | | | |
|---|---|---|---|
| 7,268,917 B2* | 9/2007 | Watanabe et al. | 358/1.9 |
| 7,391,450 B2* | 6/2008 | Pinto et al. | 348/251 |
| 8,390,735 B2* | 3/2013 | Ishimasa et al. | 348/363 |
| 2004/0095611 A1* | 5/2004 | Watanabe et al. | 358/3.26 |
| 2011/0037874 A1* | 2/2011 | Ishimasa et al. | 348/229.1 |

FOREIGN PATENT DOCUMENTS

JP 2004-038728 A 2/2004

* cited by examiner

*Primary Examiner* — Ahmed A Berhan
(74) *Attorney, Agent, or Firm* — Sony Corporation

(57) ABSTRACT

There is provided an imaging apparatus including an image sensor that converts an optical image captured through a lens into an electrical signal, and a shutter that has blade members to be opened and closed at a time of photographing. Correction of shading that is generated by an operation of the shutter is performed on a basis of an elliptical shape, and the elliptical shape is inclined in a direction according to an operation direction of the blade members.

11 Claims, 14 Drawing Sheets

23 · · · SHUTTER
23c · · · BLADE MEMBER

23A ··· SHUTTER
23d ··· BLADE MEMBER

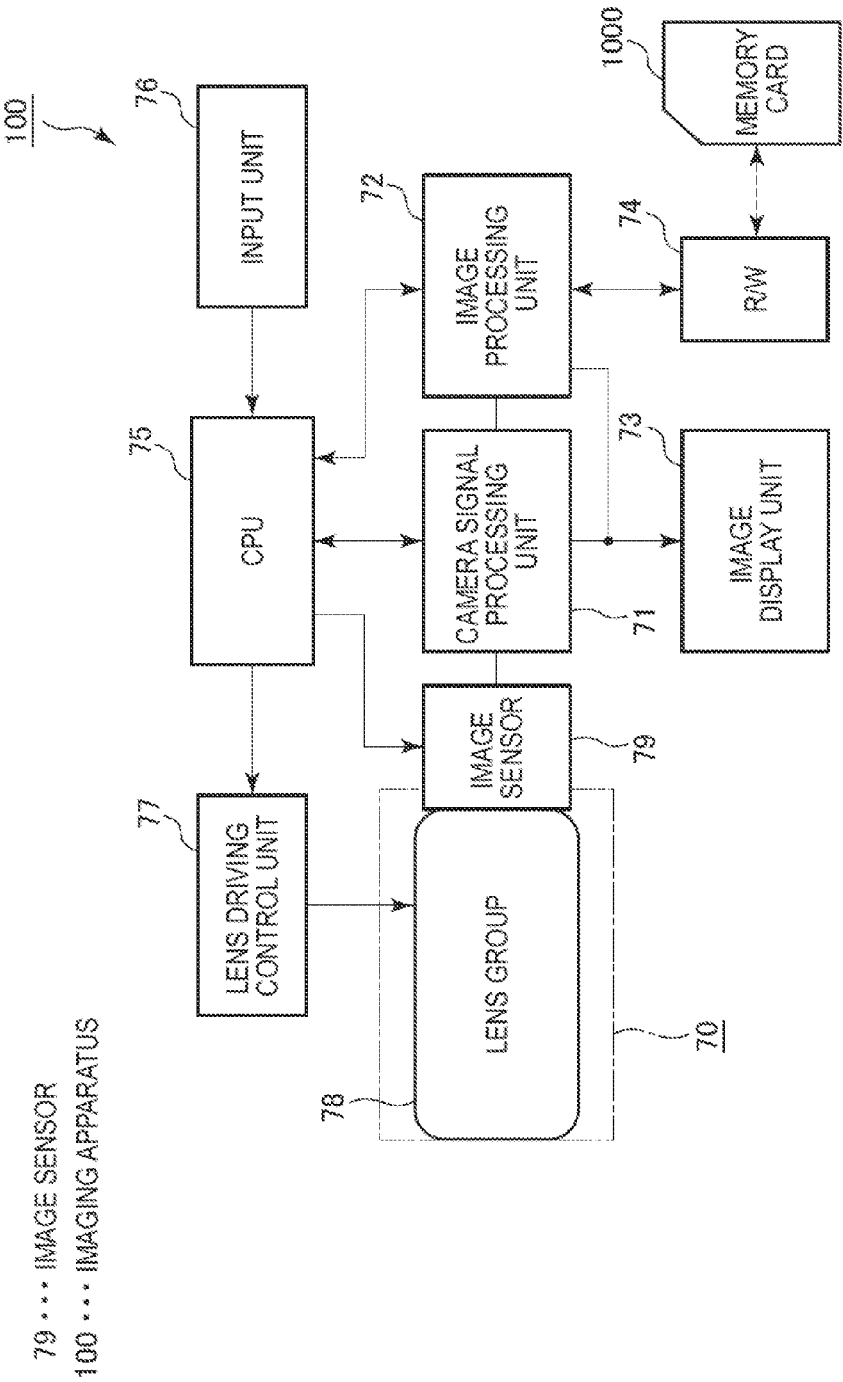

IMAGING APPARATUS FOR SHADING CORRECTION

CROSS-REFERENCE TO RELATED APPLICATION

The present application claims priority from Japanese Patent Application No. JP 2012-126406 filed in the Japanese Patent Office on Jun. 1, 2012, the entire content of which is incorporated herein by reference.

BACKGROUND

The present disclosure relates to an imaging apparatus and more particularly, to an imaging apparatus that performs correction of shading generated by an operation of a shutter, on the basis of an elliptical shape inclined in a direction according to an operation direction of blade members, and improves image quality.

In various imaging apparatuses such as a video camera and a still camera, a shutter is operated at the time of photographing and an image is generated. In addition, the shutter is operated by opening/closing of blade members.

In such an imaging apparatus, because the blade members are opened and closed at the time of photographing, an amount of light (exposure amount) to be taken by each region of an image becomes different. That is, in a closing operation of the blade members, an outer circumferential portion of the image is closed immediately after movement of the blade members starts and a center portion of the image is closed after the outer circumferential portion is closed. In an opening operation of the blade members, the center portion of the image is opened immediately after the movement of the blade members starts and the outer circumferential portion of the image is opened after the center portion is opened. Therefore, a time for which the image is closed by the blade members increases as the region of the image comes close to the outer circumferential portion from the center portion. For this reason, an amount of light taken in the outer circumferential portion of the image becomes smaller than an amount of light taken in the center portion of the image. As a result, irregularities of the amounts of light are caused by the regions of the image and shading is generated.

Therefore, in the imaging apparatus, correction of the shading is performed to prevent image quality from being deteriorated due to the shading, that is, remove a difference in light and dark by the regions of the image.

As a method of correcting the shading, a method of correcting the shading on the basis of an elliptical shape inclined to an image has been known (for example, Japanese Patent Application Laid-Open (JP-A) No. 2004-38728).

SUMMARY

As described above, the shading is generated when the blade members of the shutter are opened and closed and the amount of light taken in each region of the image becomes different. Therefore, an aspect of a difference of the amount of light in each region of the image is changed by an operation direction (opening/closing direction) of the blade members of the shutter.

As such, the operation direction of the blade members of the shutter affects the quality of the image. For this reason, if control is not performed in consideration of the operation direction of the blade members, the image quality may be deteriorated.

It is desirable to enable image quality to be improved.

According to an embodiment of the present disclosure, there is provided an imaging apparatus including an image sensor that converts an optical image captured through a lens into an electrical signal, and a shutter that has blade members to be opened and closed at a time of photographing. Correction of shading that is generated by an operation of the shutter may be performed on a basis of an elliptical shape, and the elliptical shape may be inclined in a direction according to an operation direction of the blade members.

Therefore, in the imaging apparatus, the correction of the shading is performed on the basis of the elliptical shape inclined in the direction according to the operation direction of the blade members.

As for the imaging apparatus, it is preferable that the blade members are opened and closed in a direction inclined to respective sides of an image formed by the image sensor.

The blade members are opened and closed in the direction inclined to each side of the image formed by the image sensor, so that the correction of the shading according to the direction of the opening/closing operation of the blade members is performed.

As for the imaging apparatus, it is preferable that an intersection point of a long axis and a short axis of the elliptical shape is shifted to a center point of the image.

The intersection point of the long axis and the short axis of the elliptical shape is shifted to the center point of the image, so that appropriate correction of the shading according to a photographing situation or an amount of light taken in the image sensor is performed.

As for the imaging apparatus, it is preferable that the correction of the shading is performed using a correction parameter stored in advance.

The correction of the shading is performed using the correction parameters stored in advance, so that appropriate correction of the shading according to a photographing state is performed.

As for the imaging apparatus, it is preferable that a correction amount and a correction region of the shading are changed according to an operation speed of the blade members at the time of the photographing.

The correction amount and the correction region of the shading are changed according to the operation speed of the blade members at the time of the photographing, so that appropriate correction of the shading according to the photographing state is performed.

As for the imaging apparatus, it is preferable that a correction amount and a correction region of the shading are changed according to a variable power state at the time of the photographing.

The correction amount and the correction region of the shading are changed according to the variable power state at the time of the photographing, so that the appropriate correction of the shading according to the photographing state is performed.

As for the imaging apparatus, it is preferable that a correction amount and a correction region of the shading are changed according to a value of an F number at the time of the photographing.

The correction amount and the correction region of the shading are changed according to the value of the F number at the time of the photographing, so that the appropriate correction of the shading according to the photographing state is performed.

As for the imaging apparatus, it is preferable that a correction amount and a correction region of the shading are changed according to a focus position at the time of the photographing.

The correction amount and the correction region of the shading are changed according to the focus position at the time of the photographing, so that the appropriate correction of the shading according to the photographing state is performed.

As for the imaging apparatus, it is preferable that a correction amount and a correction region of the shading are changed based on each of color channels R/Gr/Gb/B.

The correction amount and the correction region of the shading are changed according to each of the color channels R/Gr/Gb/B, so that the appropriate correction of the shading according to the photographing state is performed.

According to an embodiment of the present disclosure, there is provided an imaging apparatus including an image sensor that converts an optical image captured through lenses into an electrical signal, and a shutter that has blade members to be opened and closed at the time of photographing. Correction of shading that is generated by an operation of the shutter may be performed on the basis of an elliptical shape, and the elliptical shape may be inclined in a direction according to an operation direction of the blade members.

According to the embodiments of the present disclosure described above, an operation direction of the blade members of the shutter that changes an aspect of a difference of an amount of light in each region of an image is considered and the correction of the shading is performed on the basis of the elliptical shape. Therefore, image quality can be improved.

According to a second embodiment of the present disclosure, as for the imaging apparatus, it is preferable that the blade members are opened and closed in a direction inclined to each side of an image formed by the image sensor.

Therefore, the correction of the shading according to the direction of the opening/closing operation of the blade members is performed and the image quality can be further improved.

According to a third embodiment of the present disclosure, as for the imaging apparatus, it is preferable that an intersection point of a long axis and a short axis of the elliptical shape is shifted to a center point of the image.

Therefore, because appropriate correction of the shading according to a photographing situation or an amount of light taken in the image sensor is performed, the image quality can be further improved.

According to a fourth embodiment of the present disclosure, as for the imaging apparatus, it is preferable that the correction of the shading is performed using correction parameters stored in advance.

Therefore, the appropriate correction of the shading according to a photographing state is performed and the image quality can be further improved.

According to a fifth embodiment of the present disclosure, as for the imaging apparatus, it is preferable that a correction amount and a correction region of the shading are changed according to an operation speed of the blade members at the time of the photographing.

Therefore, the appropriate correction of the shading according to the photographing state is performed and the image quality can be further improved.

According to a sixth embodiment of the present disclosure, as for the imaging apparatus, it is preferable that a correction amount and a correction region of the shading are changed according to a variable power state at the time of the photographing.

Therefore, the appropriate correction of the shading according to the photographing state is performed and the image quality can be further improved.

According to a seventh embodiment of the present disclosure, as for the imaging apparatus, it is preferable that a correction amount and a correction region of the shading are changed according to a value of an F number at the time of the photographing.

Therefore, the appropriate correction of the shading according to the photographing state is performed and the image quality can be further improved.

According to an eighth embodiment of the present disclosure, as for the imaging apparatus, it is preferable that a correction amount and a correction region of the shading are changed according to a focus position at the time of the photographing.

Therefore, the appropriate correction of the shading according to the photographing state is performed and the image quality can be further improved.

According to a ninth embodiment of the present disclosure, as for the imaging apparatus, it is preferable that a correction amount and a correction region of the shading are changed according to each of color channels R/Gr/Gb/B.

Therefore, the appropriate correction of the shading according to the photographing state is performed and the image quality can be further improved.

BRIEF DESCRIPTION OF THE DRAWINGS

FIG. 15 is a block diagram illustrating an imaging apparatus.

DETAILED DESCRIPTION OF THE EMBODIMENT(S)

Figure 1:
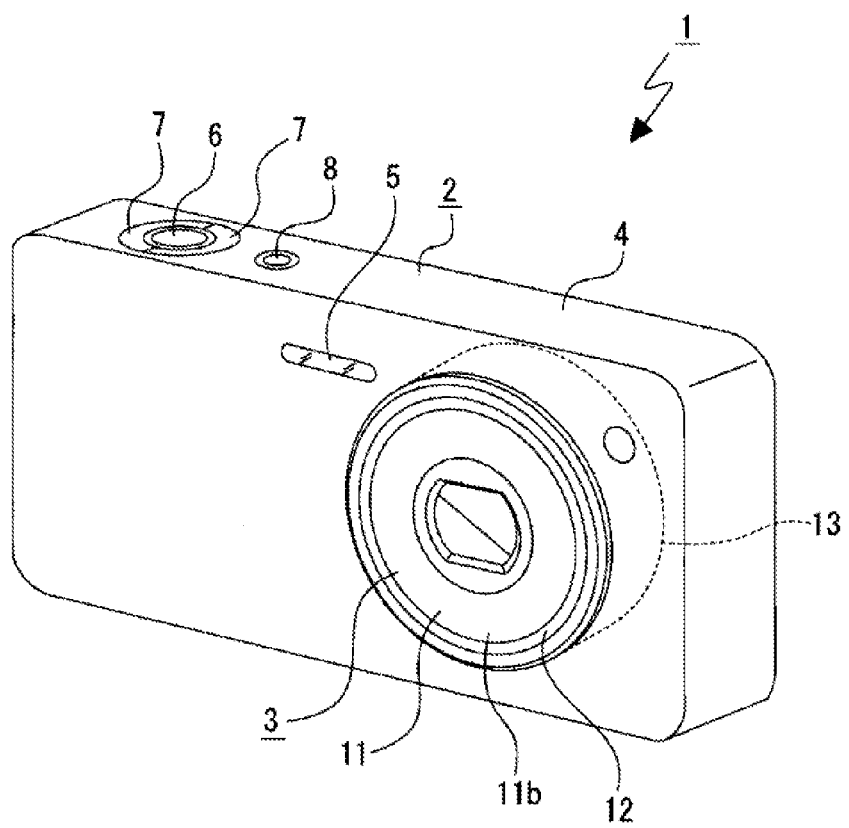
FIG. 1 is a diagram illustrating preferred embodiments of the present disclosure with FIGS. 2 to 15 and is a perspective view of an imaging apparatus in a state in which a lens barrel is stored in an apparatus body.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In an embodiment of the present disclosure to be described below, an imaging apparatus is applied to a still camera.

However, the present disclosure is not limited to the still camera. For example, the present disclosure can be applied widely to various imaging apparatuses incorporated in video cameras or other apparatuses.

In the following explanation, forward, backward, upward, downward, leftward, and rightward directions are shown by directions viewed from a photographer at the time of photographing by the still camera. Therefore, an object side becomes a forward side and a photographer side becomes a backward side.

The forward, backward, upward, downward, leftward, and rightward directions to be described below are only for the convenience of explanation. In the embodiment of the present disclosure, the directions are not limited to the forward, backward, upward, downward, leftward, and rightward directions.

[Configuration of Imaging Apparatus]

First, an entire configuration of an imaging apparatus 1 will be described (refer to FIGS. 1 to 3).

Figure 2:
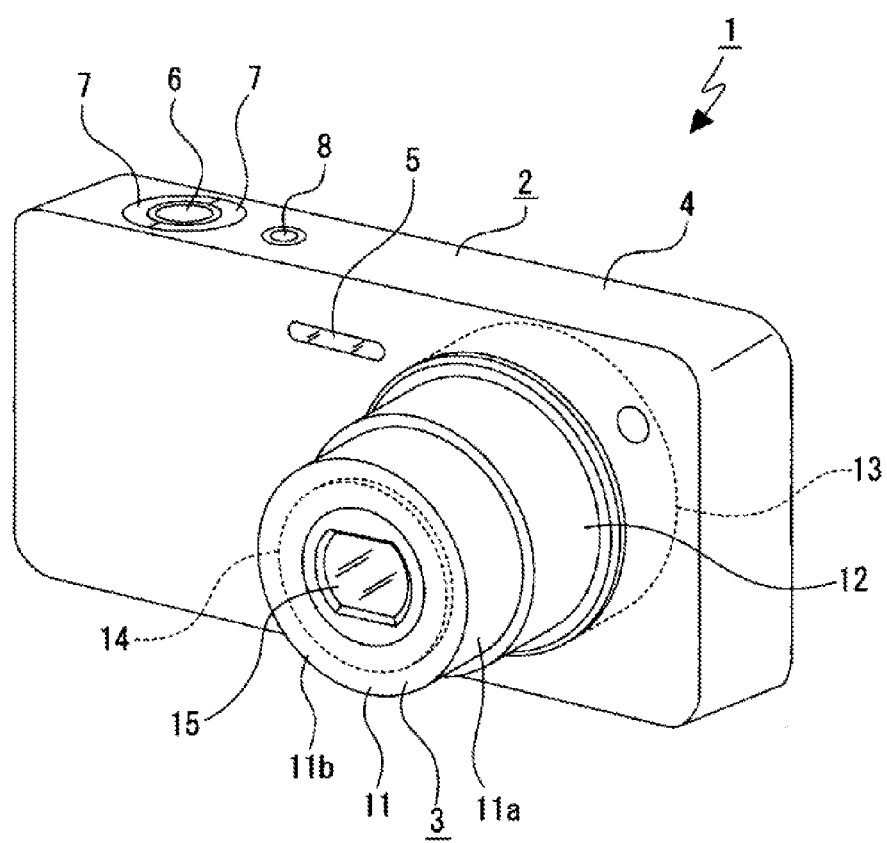
FIG. 2 is a perspective view of an imaging apparatus in a state in which a lens barrel protrudes from an apparatus body.

As illustrated in FIGS. 1 and 2, the imaging apparatus 1 includes an apparatus body 2 and a lens barrel 3 that is supported to the apparatus body 2 to be movable in a forward-to-backward direction (optical axis direction). The imaging apparatus 1 is a so-called collapsible imaging apparatus in which the lens barrel 3 is stored in the apparatus body 2 at the time of non-photographing (refer to FIG. 1) and the lens barrel 3 protrudes forward from the apparatus body 2 at the time of photographing (refer to FIG. 2). The lens barrel 3 is extended between a storage position (refer to FIG. 1) where the lens barrel 3 is stored in the apparatus body 2 and an extension position (refer to FIG. 2) where the lens barrel 3 protrudes forward from the apparatus body 2.

In the collapsible imaging apparatus 1, both miniaturization (thickness decreasing) at the time of non-photographing and securing of superior optical performance at the time of photographing can be realized.

Figure 3:
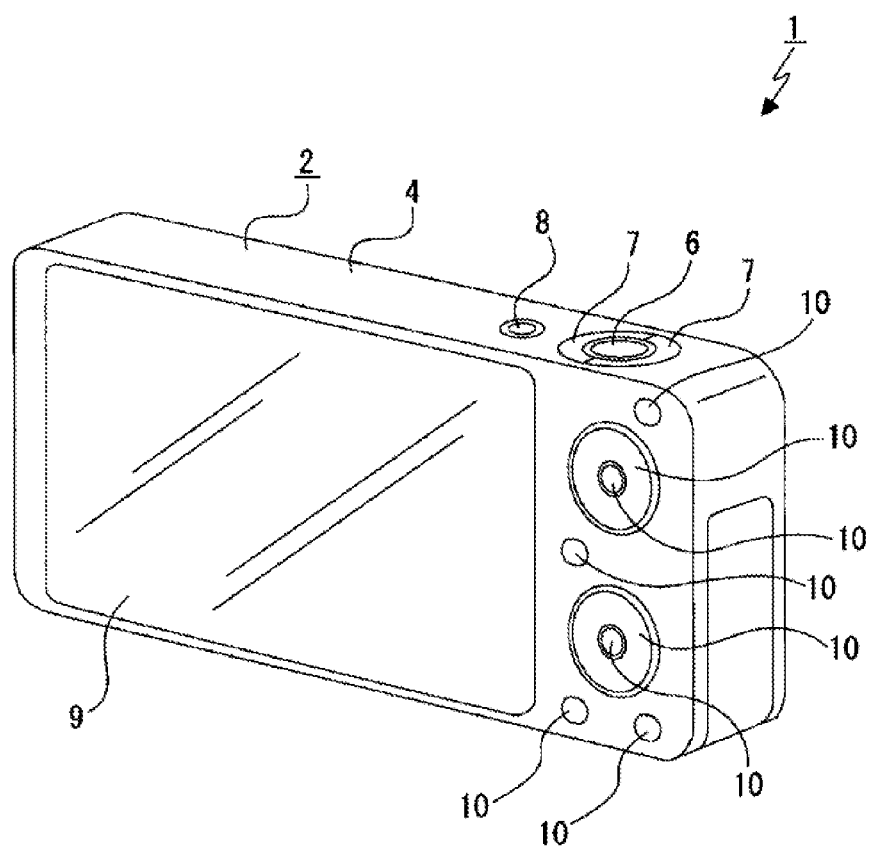
FIG. 3 is a perspective view of an imaging apparatus when viewed from the side opposite to viewing sides of FIGS. 1 and 2.

The apparatus body 2 is formed by arranging necessary units inside and outside a horizontally long and flat casing 4 (refer to FIGS. 1 to 3).

On a front surface of the apparatus body 2, a flash 5 is provided. On a top surface of the apparatus body 2, a shutter button 6, a zoom switch 7, and a power supply button 8 are provided. On a rear surface of the apparatus body 2, a display 9 and various operation units 10 are provided.

[Configuration of Lens Barrel]

Next, a specific configuration of the lens barrel 3 will be described.

The lens barrel 3 has a first movement frame 11, a second movement frame 12, and a fixed ring 13 (refer to FIGS. 1 and 2).

The first movement frame 11 has an outer circumferential portion 11a that is formed in an approximately cylindrical shape and a front surface portion 11b that is projected inward from a front end portion of the outer circumferential portion 11a.

The second movement frame 12 is formed in an approximately cylindrical shape that is larger than the shape of the outer circumferential portion 11a of the first movement frame 11. The first movement frame 11 is supported to the second movement frame 12 to be movable in a forward-to-backward direction (optical axis direction).

The fixed ring 13 is formed in an approximately cylindrical shape that is larger than the shape of the second movement frame 12. The second movement frame 12 is supported to the fixed ring 13 to be movable in a forward-to-backward direction.

In the first movement frame 11, a one group unit 14 is held. The one group unit 14 moves in a forward-to-backward direction according to movement of the first movement frame 11. In the one group unit 14, a first lens group 15 is held.

Figure 4:
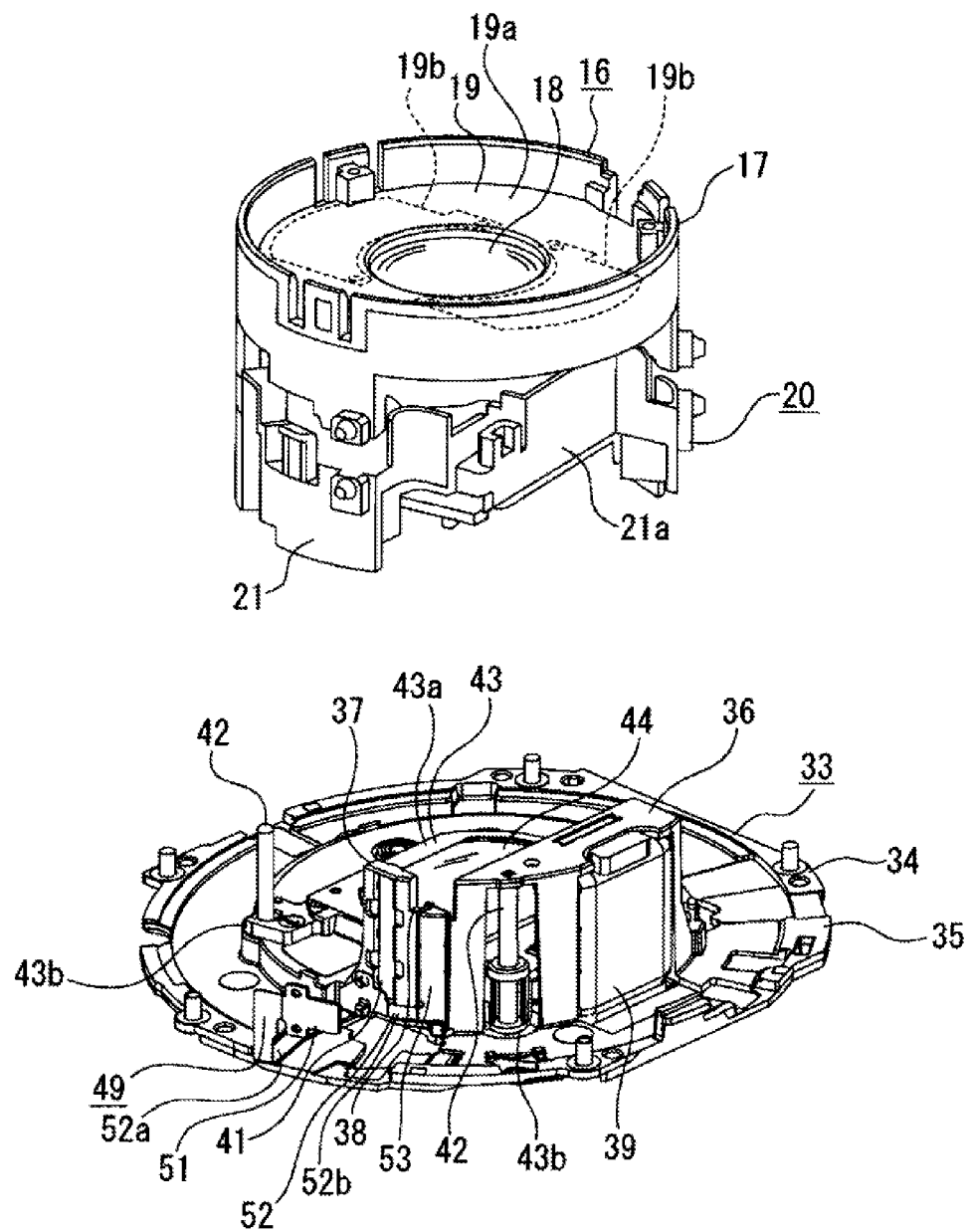
FIG. 4 is a partially exploded perspective view of a two group unit, a three group unit, and a four group unit.

In the second movement frame 12, a two group unit 16 is held (refer to FIG. 4). The two group unit 16 moves in a forward-to-backward direction according to movement of the second movement frame 12.

The two group unit 16 has a holding frame 17 of which an external shape is a circular shape. In the holding frame 17, a second lens group 18 is held. On the side of a front surface of the holding frame 17, an aperture diaphragm 19 is disposed. The aperture diaphragm 19 has a base plate 19a that has an approximately annular shape and diaphragm blades 19b that open/close an opening of the base plate 19a. The diaphragm blades 19b are operated by a blade driving unit such as a driving motor (not illustrated in the drawings) that is provided in the two group unit 16.

Figure 5:
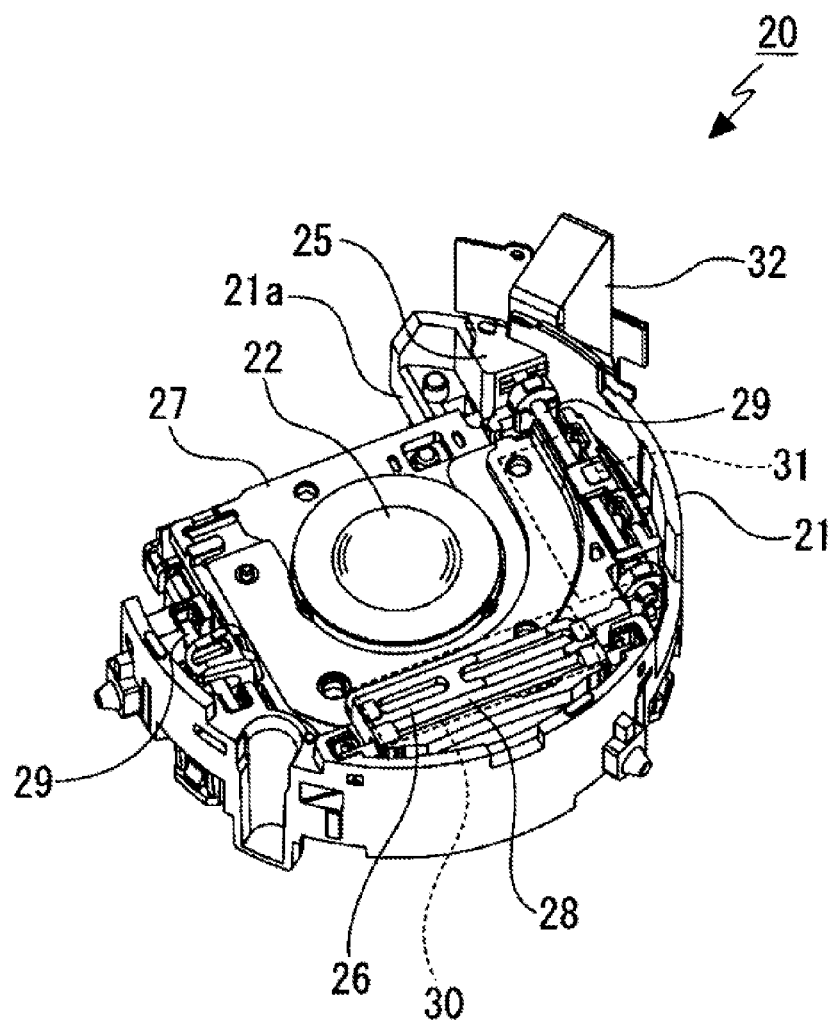
FIG. 5 is a perspective view of a three group unit.
Figure 6:
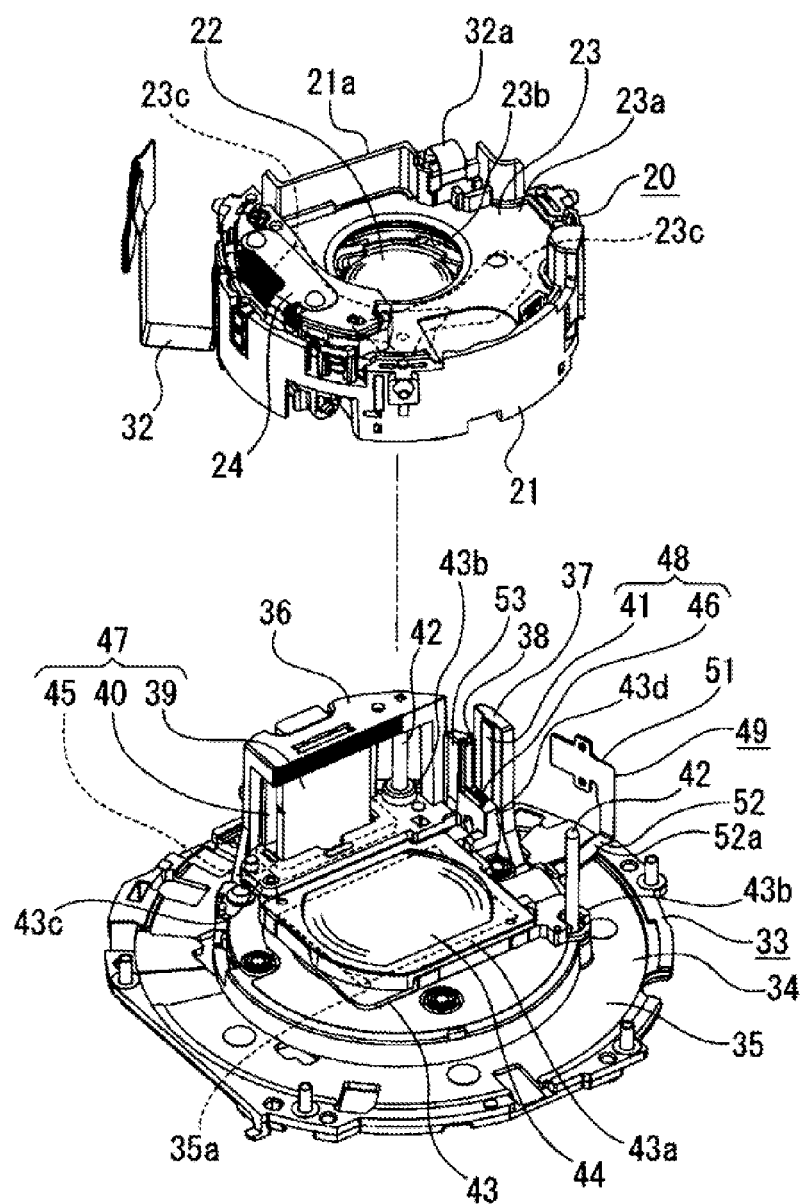
FIG. 6 is an exploded perspective view of a three group unit and a four group unit.

In the second movement frame 12, a three group unit 20 is held (refer to FIGS. 4 to 6). The three group unit 20 moves in a forward-to-backward direction according to movement of the second movement frame 12.

The three group unit 20 has a lens holding frame 21. The lens holding frame 21 has a notched portion 21a that has a shape obtained by partially cutting a circular shape. In the lens holding frame 21, a third lens group 22 is held.

On the side of a front surface of the lens holding frame 21, a shutter 23 is disposed. The shutter 23 has a supporting base 23a and blade members 23c that open/close a light transmitting hole 23b of the supporting base 23a. The blade members 23c are operated by a shutter driving unit 24 that is provided in the three group unit 20.

The blade members 23c rotate around a rotation supporting point (not illustrated in the drawings) that is provided in an obliquely rightward portion on the basis of the center of the light transmitting hole 23b. Therefore, the blade members 23c rotate in a direction inclined to each of sides of an image formed by an image sensor, that is, each of sides positioned at upper, lower, left, and right sides.

As such, the blade members 23c rotate in the direction inclined to each side of the image, so that a space of the three group unit 20 can be effectively used as a movement trace of the blade members 23c. As a result, the miniaturization of the three group unit 20 can be achieved. Therefore, the notched portion 21a can be formed in the lens holding frame 21 by the miniaturization of the three group unit 20.

As illustrated in FIG. 5, the lens holding frame 21 has a supporting base 25, a first movable base 26 that is supported to the supporting base 25 to be movable in a leftward-to-rightward direction, and a second movable base 27 that is supported to the first movable base 26 to be movable in an upward-to-downward direction.

A first guide shaft 28 that extends in a leftward-to-rightward direction is mounted to a lower end portion of the supporting base 25 and second guide shafts 29 that extend in an upward-to-downward direction are mounted to both end portions of left and right sides, respectively.

The first movable base 26 is guided to the first guide shaft 28, is integrated with the second movable base 27, and moves in a leftward-to-rightward direction with respect to the supporting base 25. The second movable base 27 is guided to the second guide shafts 29 and moves in an upward-to-downward direction with respect to the first movable base 26. The first movable base 26 and the second movable base 27 move, so that the third lens group 22 moves in a leftward-to-rightward direction and an upward-to-downward direction and camera shake correction is performed.

The three group unit 20 is provided with a first correction driving unit 30 and a second correction driving unit 31 that move the first movable base 26 and the second movable base 27, respectively. Each of the first correction driving unit 30 and the second correction driving unit 31 has a magnet and a coil that are not illustrated in the drawings. A driving current is supplied from a power supply circuit (not illustrated in the drawings) to each coil through a flexible substrate 32.

Figure 7:
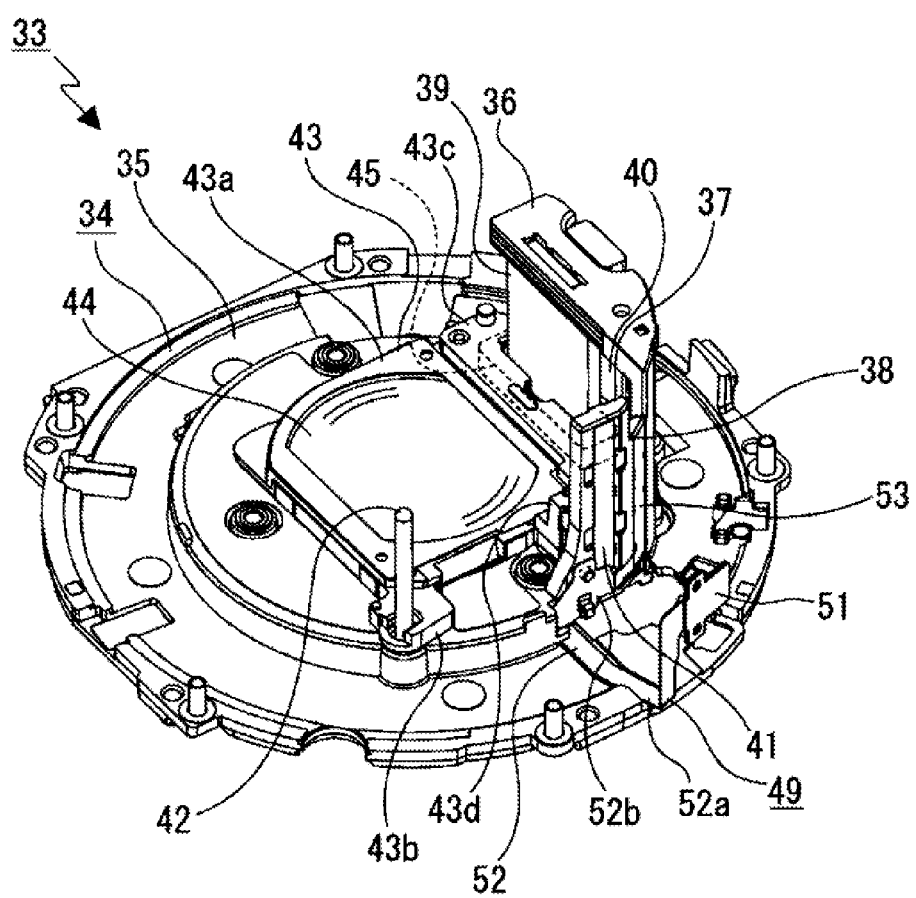
FIG. 7 is a perspective view of a four group unit.

A four group unit 33 is mounted to the fixed ring 13. The four group unit 33 is configured by supporting or mounting predetermined units to a lens barrel base 34 (refer to FIGS. 6 and 7). The lens barrel base 34 has a base surface portion 35 that is toward a forward-to-backward direction and has an approximately circular plate shape and a driving-side holding unit 36, a detection-side holding unit 37, and a mounting unit 38 that protrude forward from the base surface portion 35.

In a center portion of the base surface portion 35, an arrangement hole 35a that has an approximately rectangular shape is formed. An element unit (not illustrated in the drawings) that has an image sensor such as a charge coupled device (CCD) or a complementary metal-oxide semiconductor (CMOS) is mounted and disposed on the arrangement hole 35a.

The driving-side holding unit 36 is provided at a position close to an upper end portion of the base surface portion 35 and a yoke 39 is mounted to the driving-side holding unit 36. The yoke 39 is formed in an annular shape that is penetrated in a leftward-to-rightward direction. A magnet 40 is mounted to an inner surface of the yoke 39.

The detection-side holding unit 37 is provided at a position close to a left end portion of the base surface portion 35 and a detecting plate 41 extending in a forward-to-backward direction is mounted to the detection-side holding unit 37.

The mounting unit 38 is formed in a shape of a plate that extends in a forward-to-backward direction and is provided between the driving-side holding unit 36 and the detection-side holding unit 37.

Guide shafts 42 are mounted to the lens barrel base 34 to be separated in an upward-to-downward direction. One guide shaft 42 is mounted to the driving-side holding unit 36 and the other guide shaft 42 is mounted to a position close to a lower end portion of the base surface portion 35 to protrude forward.

A four group lens frame 43 is supported to the lens barrel base 34 to be movable in a forward-to-backward direction. The four group lens frame 43 is guided to the guide shafts 42 and moves in a forward-to-backward direction.

The four group lens frame 43 has a holding unit 43a, bearing units 43b, a coil mounting unit 43c, and a sensor mounting unit 43d. In the holding unit 43a, a fourth lens group 44 is held. The bearing units 43b protrude outward from an outer circumferential surface of the holding unit 43a and are slidably supported to the guide shafts 42, respectively. The coil mounting unit 43c protrudes outward from the outer circumferential surface of the holding unit 43a, a coil 45 is mounted to the coil mounting unit 43c, and a part of the yoke 39 is inserted into the coil 45. The sensor mounting unit 43d protrudes outward from the outer circumferential surface of the holding unit 43a, a detecting element 46 is mounted to the sensor mounting unit 43d, and the detecting element 46 is positioned to face the detecting plate 41.

A flexible printed wiring plate 47 is connected to the coil 45 and the detecting element 46. One end portion of the flexible printed wiring plate 47 is connected to the coil and the detecting element 46 and the other end portion thereof is led outward from the base surface portion 35 and is connected to a power supply circuit (not illustrated in the drawings). An intermediate portion of the flexible printed wiring plate 47 is partially pressed by a pressing member 48 and is mounted to the mounting unit 38.

In the lens barrel base 34, the outer circumferential portion of the base surface portion 35 is mounted to a rear end portion of the fixed ring 13 by screwing.

In a state in which the three group unit 20 and the four group unit 33 are arranged in an optical axis direction, the driving-side holding unit 36, the detection-side holding unit 37, and the mounting unit 38 of the four group unit 33 are positioned in the notched portion 21a of the three group unit 20.

Therefore, in the first movement frame 12 and the fixed ring 13, the three group unit 20 and the part of the four group unit 33 are positioned in an overlapped state in a radial direction and the miniaturization of the lens barrel 3 can be achieved.

Figure 8:
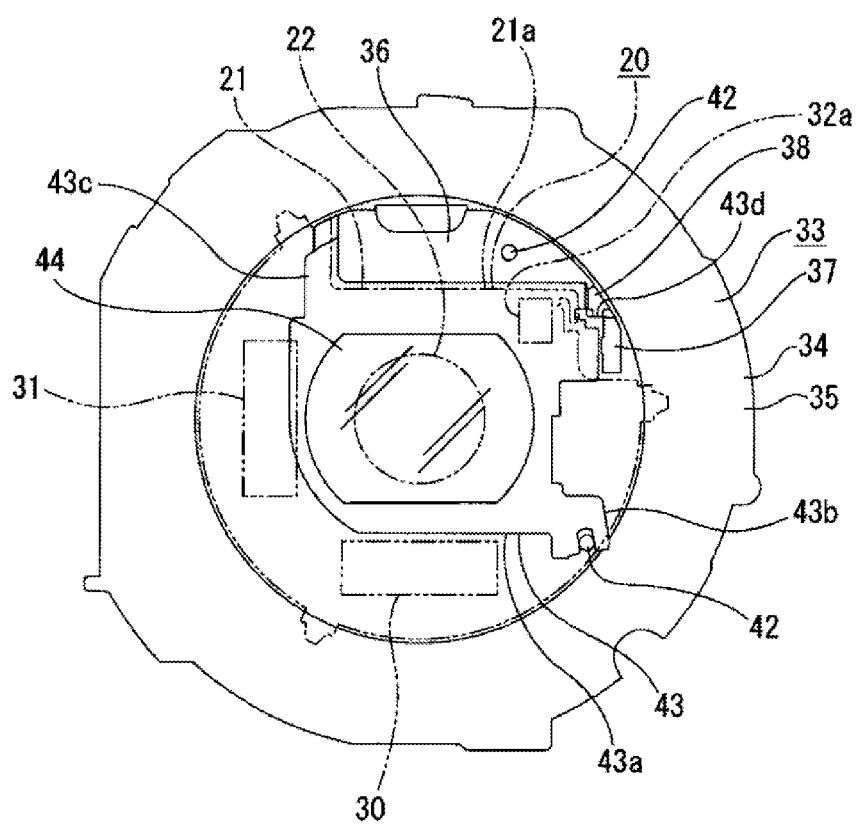
FIG. 8 is a schematic front view illustrating a positional relation of a third lens group and a fourth lens group.
Figure 9:
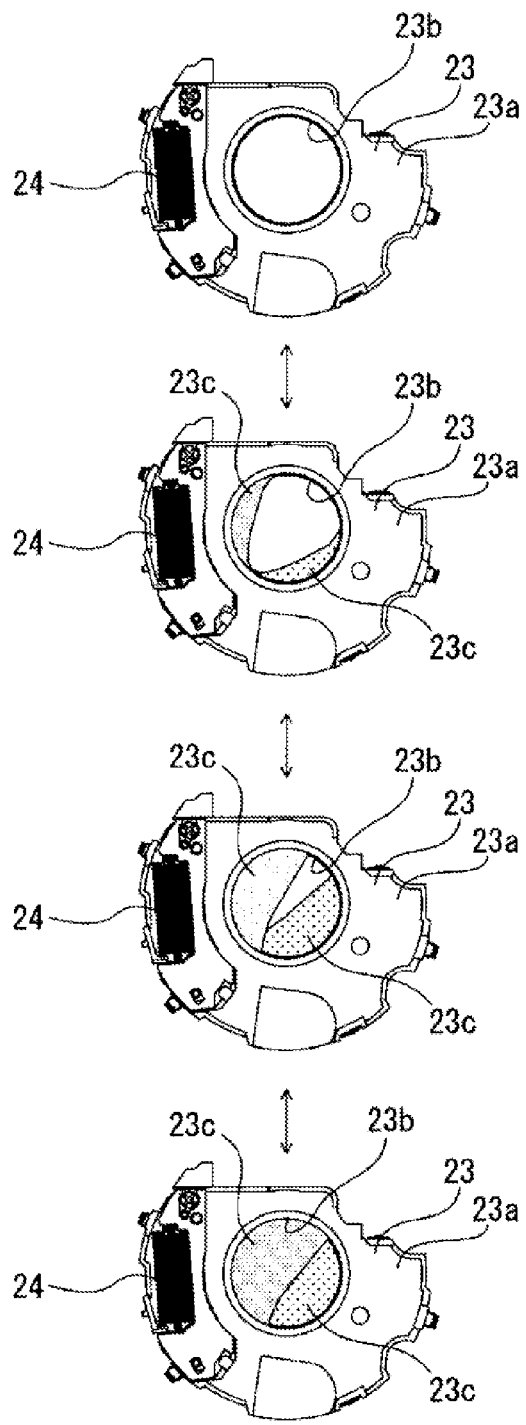
FIG. 9 is a front view illustrating an opening/closing state of a shutter.
Figure 10:
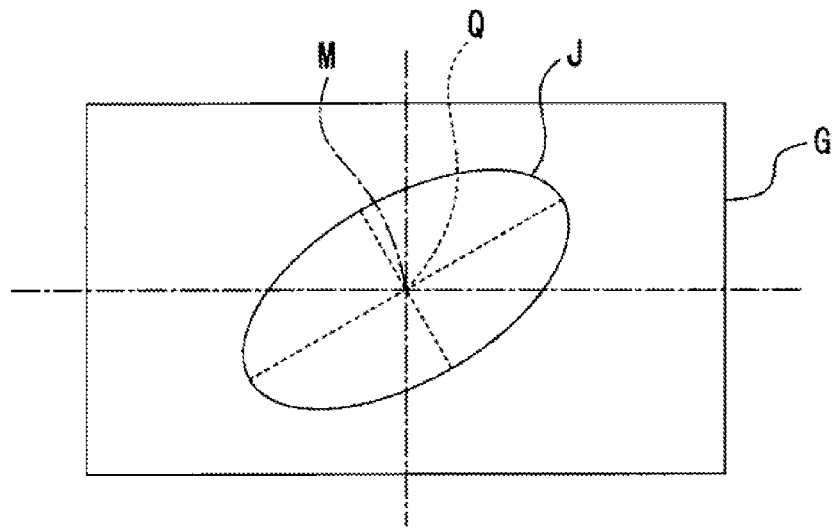
FIG. 10 is a conceptual diagram illustrating a relation of an elliptical shape becoming a correction standard of shading and an image sensor.

At this time, the first correction driving unit 30 of the three group unit 20 is positioned at the front side of a lower end portion of the base surface portion 35 and faces a driving unit 47 of the four group unit 33 (refer to FIG. 8). The second correction driving unit 31 of the three group unit 20 is positioned at the front side of a right end portion of the base surface portion 35 and faces a position detecting unit 48 of the four group unit 33.

Therefore, the first correction driving unit 30 of the three group unit 20 and the driving unit 47 of the four group unit 33 are positioned to be opposite to each other in an upward-to-downward direction with an optical axis therebetween and the second correction driving unit 31 of the three group unit 20 and the position detecting unit 48 of the four group unit 33 are positioned to be opposite to each other in a leftward-to-rightward direction with the optical axis therebetween As such, the first correction driving unit 30 and the driving unit 47 are positioned to be opposite to each other with the optical axis therebetween and the second correction driving unit 31 and the position detecting unit 48 are positioned to be opposite to each other with the optical axis therebetween. Thereby, the space can be effectively used and the miniaturization of the lens barrel 3 can be achieved.

The first correction driving unit 30 and the driving unit 47 are positioned to be opposite to each other with the optical axis therebetween and the second correction driving unit 31 and the position detecting unit 48 are positioned to be opposite to each other with the optical axis therebetween. As a result, a constant distance is secured between the first correction driving unit 30 and the driving unit 47 and a constant distance is secured between the second correction driving unit 31 and the position detecting unit 48. The driving unit 47 is disposed on the upper side of the optical axis, the first correction driving unit 30 is disposed on the right side of the optical axis, the second correction driving unit 31 is disposed on the lower side of the optical axis, and the position detecting unit 48 is disposed on the left side of the optical axis. As a result, a constant distance is secured between the individual units.

Accordingly, mutual magnetic field interference between the driving unit 47, the first correction driving unit 30, the second correction driving unit 31, and the position detecting unit 48 can be avoided and reliability of operations of the driving unit 47, the first correction driving unit 30, the second correction driving unit 31, and the position detecting unit 48 can be improved.

In the four group unit 33, if power is supplied to the coil 45, a thrust is generated in the driving unit 47 and the four group lens frame 43 is guided to the guide shafts 42 and moves in a forward-to-backward direction (optical axis direction). As a result, focusing is performed.

At this time, power is supplied to the detecting element 46 and a position of the four group lens frame 43 in a forward-to-backward direction is detected by the position detecting unit 48.

[Operation of Shutter and Correction of Shading]

Next, an operation of the shutter 23 and correction of the shading will be described (refer to FIGS. 9 to 13).

As described above, in the shutter 23, the blade members 23c rotate in a direction inclined to each side of an image formed by the image sensor. When the blade members 23c are operated, an opening shape of the light transmitting hole 23b becomes a shape similar to an elliptical shape (refer to FIG. 9).

When the light transmitting hole 23b is opened and closed by the blade members 23c in the shutter 23, an amount of light that is taken in the image sensor becomes different according to each region. In particular, because an amount of light in a peripheral region decreases, the following correction of the shading is performed in the image sensor 1.

The correction of the shading is performed on the basis of an elliptical shape of a direction according to an opening/closing direction of the blade members 23c. That is, a long axis and a short axis of an elliptical shape J in the correction of the shading are inclined with respect to a leftward-to-rightward direction and an upward-to-downward direction, respectively (refer to FIG. 10). The correction of the shading is performed by setting correction gain to a concentric ellipse, detecting a position, an angle, or a degree at which the amount of light of the peripheral region decreases, and increasing a signal value of the correction gain according to a detection result.

The elliptical shape J that is used for the correction of the shading can be changed according to a size or a direction of an opening shape in the light transmitting hole 23b. For example, lengths of the long axis and the short axis or directions of the long axis and the short axis may be arbitrarily set.

Figure 11:
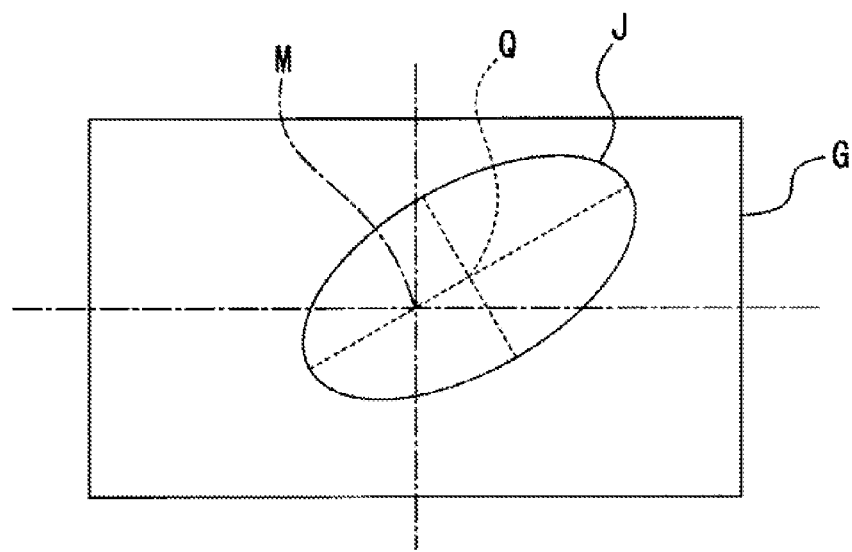
FIG. 11 is a conceptual diagram illustrating a relation of an elliptical shape becoming a correction standard of shading and an image sensor in a state in which an intersection point of the elliptical shape is shifted from a center point.

When a maximum value of an amount of light taken in an image G does not exist at a center point M of the image G, an intersection point of the long axis and the short axis of the elliptical shape J may be shifted to the center point M (refer to FIG. 11).

Hereinafter, a specific example of the correction of the shading will be described (refer to FIGS. 12 and 13).

Figure 12:
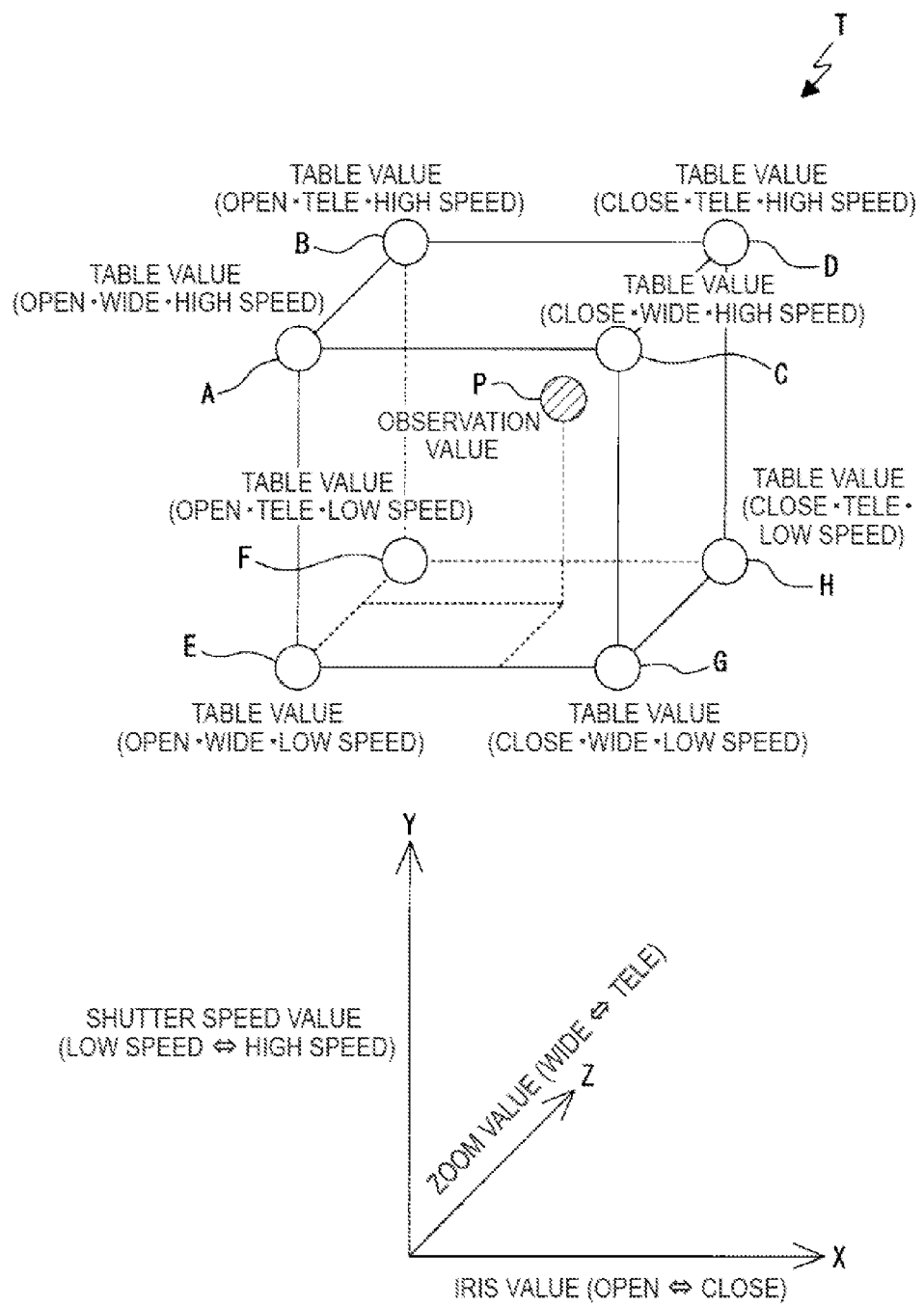
FIG. 12 is a conceptual diagram illustrating a table.
Figure 13:
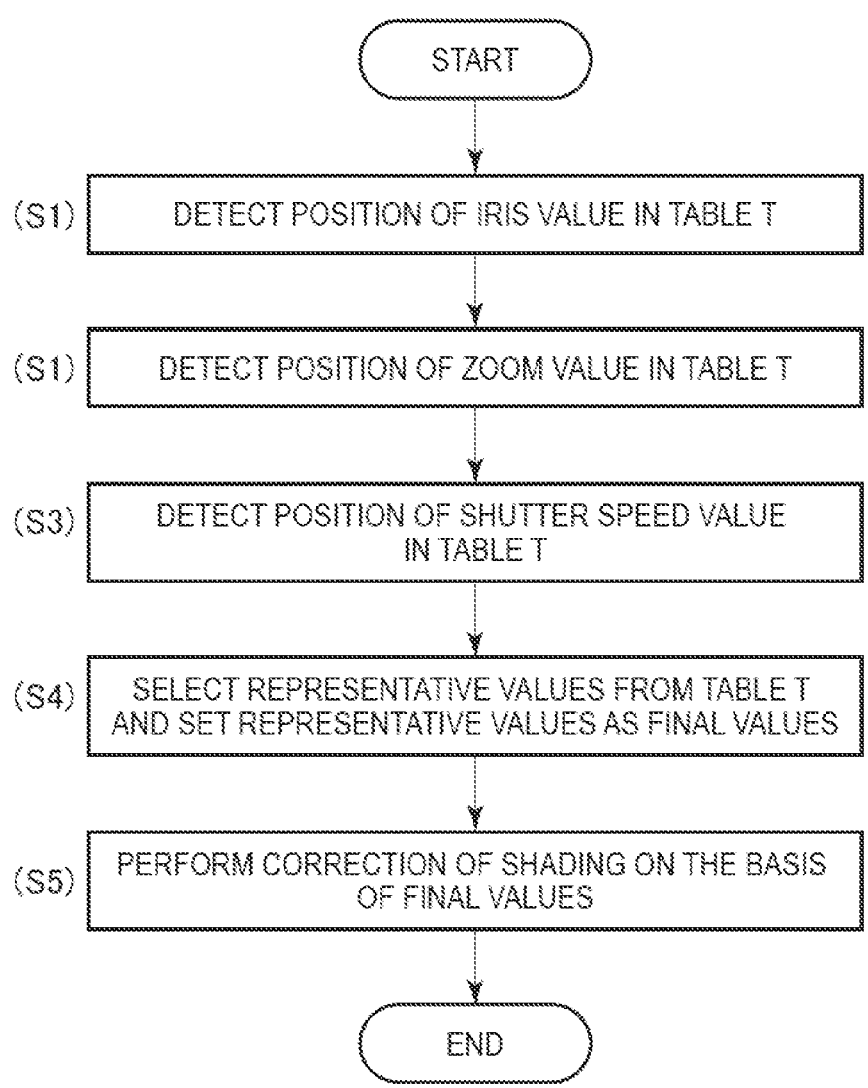
FIG. 13 is a flowchart illustrating a correction sequence of shading.

When the shading is corrected, a table T that has a parameter in each of three axis directions is used (refer to FIG. 12). With regard to three axes, an X axis shows an opening/closing position (iris value) of the aperture diaphragm 19, a Y axis shows an operation speed (shutter speed value) of the blade members 23c of the shutter 23, and a Z axis shows a variable power value (zoom value). FIG. 12 illustrates an observation value P at the time of photographing and parameters A to H of eight places in the vicinity of a position of the observation value P. In each of the parameters A to H, a peculiar iris value, a shutter speed value, and a zoom value are stored.

Accordingly, in the imaging apparatus 1, a correction amount and a correction region of the shading are changed according to an iris value (F number), an operation speed of the blade members 23c, and a variable power state, as described below.

The table T is made according to the lengths of the long axis and the short axis of the elliptical shape J, the directions of the long axis and the short axis of the elliptical shape J, and a shift amount of an intersection point Q in the elliptical shape J with respect to the center point M.

Hereinafter, a correction sequence of the shading will be described with reference to a flowchart illustrated in FIG. 13. The following processing of steps S1 to S5 is executed according to the lengths of the long axis and the short axis of the elliptical shape J, the directions of the long axis and the short axis of the elliptical shape J, and the shift amount of the intersection point Q in the elliptical shape J with respect to the center point M.

In step S1, the correction of the shading is started by photographing and it is detected which position of the table T an iris value at the time of photographing corresponds to. For example, the position is detected at a nearest position in the opening side or the closing side of the aperture diaphragm 19 or is detected by calculation by an internal division ratio between the opening side and the closing side.

In step S2, it is detected which position of the table T a zoom value at the time of photographing corresponds to. For example, the position is detected at a nearest position in a wide angle side and a telephoto side or is detected by calculation by an internal division ratio between the wide angle side and the telephoto side.

In step S3, it is detected which position of the table T a shutter speed value at the time of photographing corresponds to. For example, the position is detected at a nearest position in a high-speed side and a low-speed side and or is detected by calculation by an internal division ratio between the high-speed side and the low-speed side. In this case, order of the detection of the iris value in step S1, the detection of the zoom value in step S2, and the detection of the shutter speed value in step S3 may be arbitrarily set and each detection may be performed at the same time.

In step S4, the parameters of the eight places in the vicinity of the position of the observation value detected by steps S1, S2, and S3 in the table T are selected as representative values and linear interpolation results of the parameters are set as final values adjusted according to the iris value, the zoom value, and the shutter speed value.

In step S5, the final values of step S4 are set to a register and the correction of the shading is performed.

The example of the case in which the table T having the parameter in each of the three axis directions is used has been described. However, the present disclosure is not limited thereto and the correction of the shading may be performed using a table that has a parameter in each of four axis directions.

In the case of four axes, a focus position (focus value) can be used as a parameter of a fourth axis.

For example, the correction amount and the correction region of the shading can be changed according to each of color channels R (red)/Gr (green)/Gb (green)/B (blue).

[Others]

Figure 14:
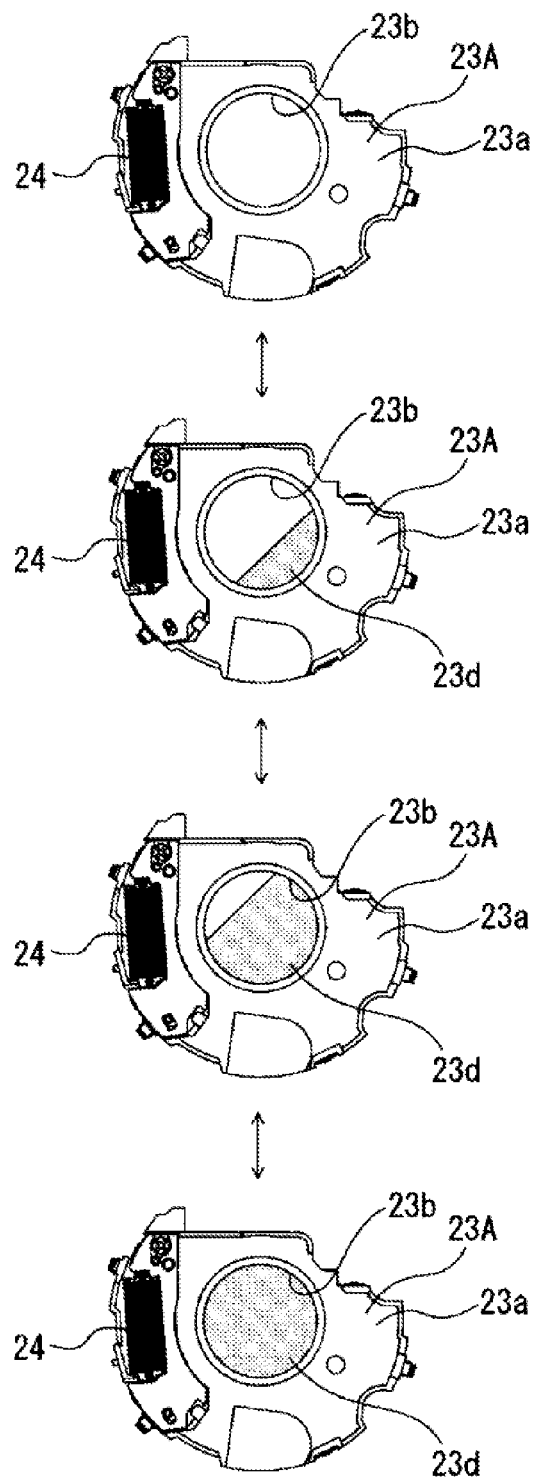
FIG. 14 is a front view illustrating an opening/closing state of a shutter having one blade member.

The example of the case in which the shutter 23 has the two blade members 23c has been described. However, a shutter 23A that has one blade member 23d may be used, as illustrated in FIG. 14.

Similar to the shutter 23, in the shutter 23A, the blade member 23d is operated in a direction inclined to each side of the image G formed by the image sensor. When the blade member 23d is operated, an opening shape in the light transmitting hole 23b becomes a shape similar to an elliptical shape.

The number of blade members of the shutter is not limited to one or two and the shutter may have three or more blade members, as long as the blade members are operated in a direction inclined to each side of the image G formed by the image sensor.

The example of the case in which the correction amount and the correction region of the shading are changed according to the iris value, the zoom value, and the shutter speed value has been described. However, the present disclosure is not limited thereto and the correction amount and the correction region of the shading may be changed according to one value of the iris value, the zoom value, and the shutter speed value.

Alternatively, the correction amount and the correction region of the shading may be changed according to two values of the iris value, the zoom value, and the shutter speed value.

[Conclusion]

As described above, in the imaging apparatus 1, the correction of the shading that is generated by the operations of the shutters 23 and 23A is performed on the basis of the elliptical shape J and the elliptical shape J is inclined according to the opening/closing directions of the blade members 23c and 23d.

The operation directions of the blade members 23c and 23d of the shutters 23 and 23A that change the aspect of the difference of the amount of light in each region are considered and the correction of the shading is performed on the basis of the elliptical shape J. Therefore, image quality can be improved.

Because the blade members 23c and 23d are opened and closed in the direction inclined to each side of the image G formed by the image sensor, the correction of the shading according to the directions of the opening/closing operations of the blade members 23c and 23d is performed and the image quality can be further improved.

The intersection point Q of the long axis and the short axis in the elliptical shape J is shifted to the center point M of the image G and the correction of the shading is performed, so that appropriate correction of the shading according to a photographing situation or an amount of light taken in the image sensor is performed. Therefore, the image quality can be further improved.

Because the correction of the shading is performed using the correction parameters stored in advance, appropriate correction of the shading according to a photographing state is performed and the image quality can be further improved.

Specifically, because the correction amount and the correction region of the shading are changed according to the iris value, the zoom value, the shutter speed value, the focus position, and each of the color channels R/Gr/Gb/B, the appropriate correction of the shading according to the photographing state is performed and the image quality can be further improved.

[Embodiment of Imaging Apparatus]

FIG. 15 is a block diagram illustrating a still camera (digital still camera) according to an embodiment of the imaging apparatus according to the present disclosure.

An imaging apparatus (video camera) 100 (corresponding to the imaging apparatus 1) includes a camera block 70 that executes an imaging function, a camera signal processing unit 71 that executes signal processing such as analog-to-digital conversion with respect to a captured image signal, and an image processing unit 72 that executes recording/reproduction processing on the image signal. The imaging apparatus 100 further includes an image display unit (corresponding to the display 9) such as a liquid crystal panel that displays a photographed image, a reader/writer (R/W) 74 that writes the image signal to a memory card 1000 and reads the image signal from the memory card 1000, a central processing unit (CPU) 75 that wholly controls the imaging apparatus 100, an input unit 76 (corresponding to the shutter button 6, the zoom switch 7, the power supply button 8, and the operation unit 10) that is configured using various switches where necessary operations are performed by a user, and a lens driving control unit 77 that controls driving of lenses disposed in the camera block 70.

The camera block 70 is configured using an optical system including a lens group 78 and an image sensor 79 such as a charge coupled device (CCD) or a complementary metal-oxide semiconductor (CMOS).

The camera signal processing unit 71 executes various signal processing, such as conversion of a signal into a digital signal, noise removing, image quality correction, and conversion of a signal into a brightness/color difference signal, with respect to an output signal from the image sensor 79.

The image processing unit 72 executes compression encoding/extension decoding processing of an image signal based on a predetermined image data format or conversion processing of data specifications such as resolution.

The image display unit 73 has a function of displaying an operation state of the user with respect to the input unit 76 or various data such as a photographed image.

The R/W 74 writes image data encoded by the image processing unit 72 to a memory card 1000 and reads the image data recorded on the memory card 1000.

The CPU 75 functions as a control processing unit to control each circuit block provided in the imaging apparatus 100 and controls each circuit block on the basis of an instruction input signal from the input unit 76.

The input unit 76 is configured using a shutter release button to perform a shutter operation or a selection switch to select an operation mode and outputs an instruction input signal according to a user operation to the CPU 75.

The lens driving control unit 77 controls a motor (not illustrated in the drawings) to drive each lens of the lens group 78, on the basis of a control signal from the CPU 75.

The memory card 1000 is a semiconductor memory that can be attached to or detached from a slot connected to the R/W 74.

Hereinafter, an operation of the imaging apparatus 100 will be described.

In a photographing waiting state, under control from the CPU 75, an image signal captured in the camera block 70 is output to the image display unit 73 through the camera signal processing unit 71 and is displayed as a camera-through image. If an instruction input signal for zooming is input from the input unit 76, the CPU 75 outputs a control signal to the lens driving control unit 77 and a predetermined lens of the lens group 78 is moved on the basis of control of the lens driving control unit 77.

If a shutter (not illustrated in the drawings) of the camera block 70 is operated by the instruction input signal from the input unit 76, the captured image signal is output from the camera signal processing unit 71 to the image processing unit 72, is subjected to the compression encoding processing, and is converted into digital data of a predetermined data format. The converted data is output to the R/W 74 and is written to the memory card 1000.

The focusing or the zooming is performed by moving the predetermined lens of the lens group 78 by the lens driving control unit 77, on the basis of the control signal from the CPU 75.

When the image data recorded on the memory card 1000 is reproduced, the predetermined image data is read from the memory card 1000 by the R/W 74, according to an operation with respect to the input unit 76, and the extension decoding processing is executed by the image processing unit 72. Then, a reproduction image signal is output to the image display unit 73 and a reproduction image is displayed.

[Present Technology]

Additionally, the present technology may also be configured as below.

(1) An imaging apparatus including:
an image sensor that converts an optical image captured through a lens into an electrical signal; and
a shutter that has blade members to be opened and closed at a time of photographing,
wherein correction of shading that is generated by an operation of the shutter is performed on a basis of an elliptical shape, and
wherein the elliptical shape is inclined in a direction according to an operation direction of the blade members.

(2) The imaging apparatus according to (1),
wherein the blade members are opened and closed in a direction inclined to respective sides of an image formed by the image sensor.

(3) The imaging apparatus according to (1) or (2),
wherein an intersection point of a long axis and a short axis of the elliptical shape is shifted to a center point of the image.

(4) The imaging apparatus according to any one of (1) to (3),
wherein the correction of the shading is performed using a correction parameter stored in advance.

(5) The imaging apparatus according to any one of (1) to (4),
wherein a correction amount and a correction region of the shading are changed according to an operation speed of the blade members at the time of the photographing.

(6) The imaging apparatus according to any one of (1) to (5),
wherein a correction amount and a correction region of the shading are changed according to a variable power state at the time of the photographing.

(7) The imaging apparatus according to any one of (1) to (6),
wherein a correction amount and a correction region of the shading are changed according to a value of an F number at the time of the photographing.

(8) The imaging apparatus according to any one of (1) to (7),
wherein a correction amount and a correction region of the shading are changed according to a focus position at the time of the photographing.

(9) The imaging apparatus according to any one of (1) to (8),
wherein a correction amount and a correction region of the shading are changed based on each of color channels R/Gr/Gb/B.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an image sensor that converts an optical image captured through a lens into an electrical signal; and
a shutter that has blade members to be opened and closed at a time of photographing,
wherein correction of shading that is generated by an operation of the shutter is performed on a basis of an elliptical shape,
wherein the elliptical shape is inclined in a direction according to an operation direction of the blade members,
wherein a correction amount and a correction region of the shading are changed according to a pre-defined parameter, and
wherein the predefined parameter corresponds to an operation speed of the blade members at the time of the photographing, a variable power state at the time of the photographing, and an iris value at the time of the photographing.

2. The imaging apparatus according to claim 1, wherein the blade members are opened and closed in a direction inclined to respective sides of an image formed by the image sensor.

3. The imaging apparatus according to claim 1, wherein an intersection point of a long axis and a short axis of the elliptical shape is shifted to a center point of the optical image.

4. The imaging apparatus according to claim 1, wherein the correction of the shading is performed using a correction parameter stored in advance.

5. The imaging apparatus according to claim 1,
wherein the iris value varies according to the opening or closing position of an aperture diaphragm of the imaging apparatus.

6. The imaging apparatus according to claim 1, wherein the correction amount and the correction region of the shading are changed according to a focus position at the time of the photographing.

7. The imaging apparatus according to claim 1, wherein the correction amount and the correction region of the shading are changed based on each of color channels R/Gr/Gb/B.

8. The imaging apparatus according to claim 1,
wherein the correction amount and the correction region of the shading are changed based on a table, and
wherein the table comprises a plurality of axes and each of the plurality of axes corresponds to the pre-defined parameter.

9. The imaging apparatus according to claim 8, wherein the operation speed of the blade members is determined by detecting a first position of the table, and wherein the first position corresponds to a nearest position in a high-speed side and a low-speed side, or a position detected by calculating an internal division ratio between the high-speed side and the low-speed side.

10. The imaging apparatus according to claim 9, wherein the variable power state is determined by detecting a second position of the table, and wherein the second position corresponds to a nearest position in a wide angle side and a telephoto side, and/or a position detected by calculating an internal division ratio between the wide angle side and the telephoto side.

11. The imaging apparatus according to claim 10, wherein the iris value is determined by detecting a third position of the table, and wherein the third position corresponds to a nearest position in an opening side or a closing side of an aperture, or a position detected by calculating an internal division ratio between the opening side and the closing side.

* * * * *